US010293310B2

(12) United States Patent
Blanchette et al.

(10) Patent No.: US 10,293,310 B2
(45) Date of Patent: May 21, 2019

(54) APPARATUS AND METHOD OF FORMING A CHEMICAL SOLUTION

(71) Applicant: INNOVATIVE WATER CARE, LLC, Wilmington, DE (US)

(72) Inventors: David Blanchette, Alpharetta, GA (US); Enloe West, Charleston, TN (US); David Turner, Lexington, KY (US)

(73) Assignee: INNOVATIVE WATER CARE, LLC, Wilmington, DE (US)

( * ) Notice: Subject to any disclaimer, the term of this patent is extended or adjusted under 35 U.S.C. 154(b) by 0 days.

(21) Appl. No.: 15/812,194

(22) Filed: Nov. 14, 2017

(65) Prior Publication Data

US 2018/0133666 A1 May 17, 2018

Related U.S. Application Data

(60) Provisional application No. 62/421,559, filed on Nov. 14, 2016.

(51) Int. Cl.

| | |
|---|---|
| ***B01F 3/12*** | (2006.01) |
| ***B01F 5/04*** | (2006.01) |
| ***C02F 1/68*** | (2006.01) |
| ***B01F 1/00*** | (2006.01) |
| *C02F 103/42* | (2006.01) |

(52) U.S. Cl.

CPC .............. *B01F 3/12* (2013.01); *B01F 1/0033* (2013.01); *B01F 5/043* (2013.01); *C02F 1/68* (2013.01); *C02F 1/688* (2013.01); *B01F 2003/1257* (2013.01); *B01F 2215/0052* (2013.01); *C02F 2103/42* (2013.01)

(58) Field of Classification Search

CPC ................................ B01F 3/12; B01F 11/0033

See application file for complete search history.

(56) References Cited

U.S. PATENT DOCUMENTS

| | | | |
|---|---|---|---|
| 3,864,090 | A | 2/1975 | Richards |
| 4,208,376 | A | 6/1980 | Sangster et al. |
| 4,420,394 | A | 12/1983 | Lewis |
| 5,374,119 | A | 12/1994 | Scheimann |
| 5,810,043 | A | 9/1998 | Grenier |
| 2002/0195404 | A1 | 12/2002 | Pickens et al. |
| 2010/0163468 | A1 | 7/2010 | Suzuki et al. |
| 2012/0067968 | A1 | 3/2012 | Brennan et al. |
| 2013/0215705 | A1 | 8/2013 | Mueller et al. |

OTHER PUBLICATIONS

PCT International Search Report and Written Opinion for the corresponding PCT/US2017/061517 dated Mar. 12, 2018 (13 pages total).

*Primary Examiner* — Sean E Conley

(74) *Attorney, Agent, or Firm* — Brown Rudnick LLP; Robert J. Tosti

(57) ABSTRACT

A low flow apparatus for creating a solution in water of a solid chemical is provided. Also provided is a cartridge containing a solid chemical which may be placed into the apparatus. Further provided is a method of using the apparatus to create a chemical solution form a solid chemical.

24 Claims, 12 Drawing Sheets

APPARATUS AND METHOD OF FORMING A CHEMICAL SOLUTION

RELATED APPLICATIONS

The present application is based on and claims priority to U.S. Provisional Patent application Ser. No. 62/421,559, which was filed on Nov. 14, 2016, and which is incorporated by reference.

FIELD OF INVENTION

The present invention relates to an apparatus which forms a solution of a chemical in water, and the method of forming a chemical solution with the apparatus.

BACKGROUND OF THE INVENTION

Apparatus for forming chemical solutions in water are known. In one particular are of use, apparatus for forming chemical solutions are used to form chemical solutions of water treatment chemicals. Some water treatment chemicals for pools, spas and the like, need to be added to water in relatively small amounts on a regular schedule. Most of the time, these chemicals are added manually by the pool owner or pool maintenance company. However, this can be time consuming and require the owner or maintenance company to be at poolside on a regular basis to add these chemicals to maintain the correct balance of chemicals in water.

Methods of adding pool chemicals such as dissolvable tablets, slow release formulations and the like can be used as well. But depending on flow rates, or lack of flow, of the pool or spa water, using these dissolvable tablets, slow release formulations and the like can result in too much or not enough of the water treatment chemical being added to the pool, spa or body of water being treated.

Water treatment apparatus can be in-line apparatus, in which the main water flow is caused to flow thru the apparatus or can be off-line apparatus. In-line apparatus often have high flow rates thru the apparatus and off-line apparatuses typically have low flow rates, generally 0.25 gallons to about 3 gallons per minute. However, with such low flow rates, getting enough flow over the slow dissolving chemicals to effectively dissolve the chemical to obtain a solution with sufficient chemical to accomplish the function of the chemical solution can be difficult.

Accordingly, there is a need in the art for water treatment apparatus that can effectively dissolve slow dissolving chemicals in an effective manner using a relatively low flow of water thru the apparatus, by placing enough, but not too much chemical, in the water to be treated. The present invention provides an answer to that need.

SUMMARY OF THE INVENTION

The present invention provides an apparatus for forming a water solution of a chemical from a solid chemical. The apparatus is effective in dissolving a slow dissolving solid chemical in water using a relatively low flow rate.

In one embodiment of the present invention, provided is an apparatus having a housing with a top, a side, and a bottom. The top and the bottom are connected to one another by the side. The top, the side and the bottom form an interior compartment and the housing has an upper portion and a lower portion. In the housing is an inlet located in the lower portion of the housing. The inlet allows water to be contacted with the solid chemical entering the housing. The housing also has an outlet located in the upper portion of the housing. The outlet allows the water contacted with the solid chemical to exit the housing. Within the interior compartment of the housing is a nozzle. The nozzle is connected to the water inlet and the nozzle is located within the interior compartment of the housing in the lower portion of the housing. The nozzle allows water entering the housing thru the inlet to contact the solid chemical. Also present is at least one support located within the interior compartment of the housing positioned between the nozzle and top of the housing. The support is adapted to receive and position a cartridge containing the solid chemical within the interior compartment of the housing or to support a solid chemical in the housing.

In further embodiment, the top of the housing has an opening which allows a cartridge containing a solid chemical, or a solid chemical to be inserted, into the housing. The apparatus also has a cap, where cap is adapted to cover the opening of the housing and to form a water tight connection with the top of the housing. The cap is removable from the housing to reveal the opening and to allow the solid chemical, or cartridge containing the solid chemical, to be inserted into the interior compartment of the housing.

In another embodiment of the present invention, the nozzle of the apparatus is an eductor. The eductor is positioned in the housing such that there is a flow of the water within the housing is directed towards the top of the housing from the eductor. The eductor has at least one fluid intake port that creates a venturi effect and allows water in the lower portion of the housing to be drawn into the eductor and sprayed towards the top of the housing.

In yet another embodiment of the present invention, the apparatus has a removable cartridge. This removable cartridge has a first end, a second end, and a sidewall connecting the first end to the second end. The first end, second end and sidewall form an internal chamber. The internal chamber contains a solid chemical, and the removable cartridge being adapted to fit into the interior compartment of the housing between the top of the housing and the at least one support located in the interior compartment of the housing. The removable cartridge may be inserted into the interior compartment thru said opening in the housing. The first end of the cartridge has a porous grid, and when the cartridge is positioned in the interior compartment of the housing, the cartridge being inserted in the housing such that the first end is positioned near the nozzle and the second end is positioned near the top of the housing. The porous grid has a first surface and an opposite second surface. The first surface comprises a plurality of projections, extending outward and away from the first surface and towards the inner chamber of the cartridge. The second surface of the porous grid faces away from the internal chamber of the cartridge. The plurality of projections extend in a generally perpendicular direction from the first surface. Further, the plurality of projections have a first end and a second end, the first end being located at the first surface of the porous grid and the second end is opposite the first end of the projections. The second end comprises a tapered end.

In a further embodiment, the at least one support is a series of supports, which allow a cartridge placed in the internal compartment of the housing to be positioned at different levels. The series of supports comprises a series of steps located on each side of the internal compartment, where each support has a complementary support within the internal compartment on the opposite side of the internal compartment.

In an additional embodiment, the cartridge has an adjustable length. The adjustable length is created by having a cartridge with two parts, including an upper part and a lower part. The upper part and the lower part are adjustably connected together with a connection means. The connection means maybe include a detent and a catch system. One of the upper part or the lower part has at least one detent, and the part without the detent has at least one catch. The catch of one part is adapted to receive the detent of the other part and the detent and catch join the upper part to the lower part to form the cartridge. The detent and the catch are such that they are releasable from each other.

In a particular embodiment, the upper part of the adjustable length cartridge has a first end, a second end and a side joining the first end of the upper part to the second end of the upper part, the first end of the upper part of having an opening, and the side of the upper part has the detent. The lower part of the adjustable length cartridge has first end, a second end and a side joining the first end of the lower part to the second end of the lower part, the second end of the lower part having an opening, and the side of the lower part has the at least one catch. The catch is adapted to receive the detent of the upper portion such that the first upper part and the second lower part are connected via the detent and catch. In a further embodiment, the second end of the lower part is sized and shaped to fit into the opening of the first end of the upper part such that an exterior surface of the side of the lower part contacts an interior surface of the side of the upper part. Further there are at least two detents on the interior surface of the side of the upper part and there are a plurality of catches located in the exterior surface of the lower part.

In a further embodiment, the apparatus may be a series of modules linked together. At least one additional module for forming a water solution from a solid chemical is provided. Each additional module of the apparatus has the same general structure as the apparatus described above. Each additional module has an additional housing, having a top, a side, and a bottom, where the top and the bottom are connected to one another by the side. The top, the side and the bottom form an additional interior compartment, and the additional housing has an upper portion and a lower portion. Further, there is an additional inlet located in the lower portion of the additional housing; the additional inlet allowing water to be contacted with the solid chemical to enter the additional housing. Also there is an additional outlet located in the upper portion of the additional housing; the additional outlet allowing the water contacted with the solid chemical to exit the additional housing. In addition, there is an additional nozzle disposed within the additional interior compartment. The additional nozzle is connected to the water additional inlet and said additional nozzle being located within the additional interior compartment of the additional housing in the lower portion of the additional housing, where the additional nozzle allows water entering the additional housing thru the additional inlet to contact the solid chemical in the additional internal compartment. The additional module further has at least one support located within the additional interior compartment positioned between the additional nozzle and the top of the additional housing. The support is adapted to receive and position a cartridge containing the solid chemical within the additional interior compartment of the additional housing or to support a solid chemical within the additional housing.

In an additional embodiment with the additional modules, the at least one additional water treatment module is in series with the first water treatment module, such that the inlet and the additional inlets are connected to a single water supply pipe and the outlet and the additional outlets are connected to the same return pipe. The water supply line is positioned to remove water at a place of having a first pressure and the water return line is position to return treated water at a place in the main line of flow having a second pressure which is lower than the first pressure.

In another embodiment, provided is a method of creating a chemical solution from a solid chemical using water. The method includes placing the apparatus described above on a bypass line from a main water flow line, and flowing water from the main water flow thru the bypass line. The formed water solution is then returned to the main flow line

DETAILED DESCRIPTION OF THE PREFERRED EMBODIMENTS

Figure 1:
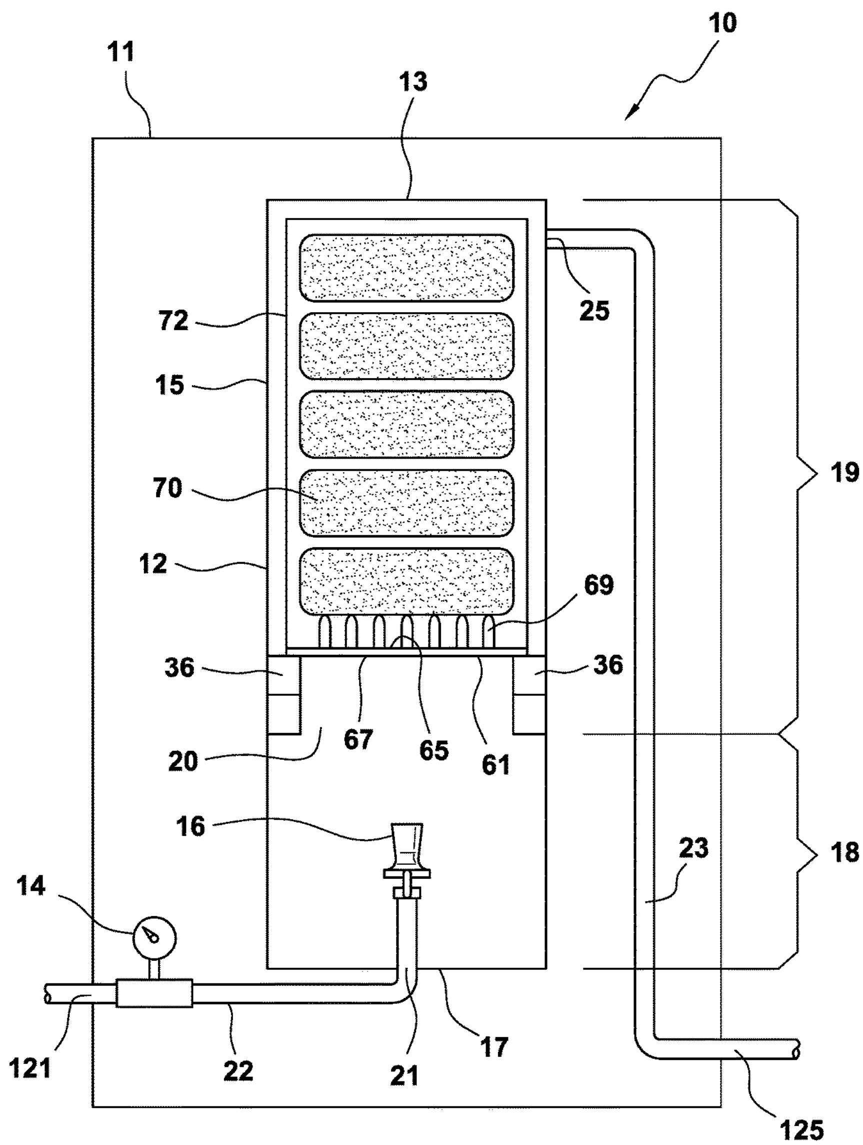
FIG. 1 shows an apparatus within the scope of the present disclosure.

It has now been surprisingly found that the apparatus as described herein, is effective in administering a solid, slow dissolving chemical from the apparatus into water to form a chemical solution. The solution may be a water treating solution, such as for a swimming pool, a spa, or municipal water supply. Referring to FIG. 1, the apparatus 10 for administering a solid chemical to water to form a water solution of the solid chemical, has a housing 12, a top 13, a side 15, and a bottom 17 oppositely positioned from the top 13. As shown in FIG. 1, the top 13 and the bottom 17 are connected to one another by the side 15. The top 13, the side 15 and the bottom 17 form an interior compartment 20. The interior compartment 20 is designed to receive and hold a solid chemical 70. The side 15 may be a continuous surface, such as forming a cylindrical shape, or the side 15 may be a series on panels, forming a polygonal cross-sectional shape, e.g., a triangle, a square, a pentagon, rectangle, or a hexagon, just to name a few. The shape of the side 15 is not critical to the function of the apparatus, but the shape of the side may be used to designate the type of solid chemical that is to be inserted into the apparatus 10. This will be described in more detail below. Typically, from an ease of manufacture perspective, the side 15 will generally form a cylindrical shape. The apparatus 10 may also optionally have an outer shell 11, which protects the apparatus from damage during use or at the use locations and/or to incorporate all the features of the apparatus within a single unit. The outer shell 11 may optionally provide some aesthetics to the apparatus.

The interior compartment 20 has a lower portion 18 and an upper portion 19. The lower portion 18 is generally defined by the volume of the interior compartment below where the solid chemical is present. The upper portion 19 is generally defined by the volume of the interior compartment 20 where the solid chemical 70 is present.

The apparatus 10 also has an inlet 21 which is located is located in the lower portion 18 of the housing 12, preferably, at a position proximal to the bottom 17. The inlet 21 is an opening located in the housing which allows water to be contacted with the solid chemical to enter the housing 12 thru the bottom 17 (as shown in FIG. 1) or the side 15 (not shown), and allows the water to enter into the interior compartment 20. The inlet 21 will have an interior side located in the compartment 20 and an exterior side located on an outer surface of the housing 12. Also present is an outlet 25 located in the upper portion 19 of the housing 12. The outlet 25 allows the water contacted with the solid chemical, or solution, to exit the interior compartment 20 of the housing 12. Like the inlet 21, the outlet 25 has an interior side located in the compartment 20 and an exterior side, located on the outside of the housing. The outlet 25 may be located in the side 15 of the housing 12 at a position proximal to top 13, as shown in FIG. 1, or may exit the housing 12 thru the top 13 (not shown). The inlet is connected with a water supply line 22 and the outlet is connected to a treated water transporting line 23.

A water distribution device or nozzle 16 is connected to the water inlet 21 of the housing 12 on the interior side of the inlet 21. The water distribution device or nozzle 16 allows the water entering the housing 12 thru the inlet 21 to contact the solid chemical 70 which may be located cartridge 60, as shown in FIG. 1, or may be placed directly in the interior compartment 20 (not shown). An exemplary water distribution device or nozzle 16 includes a spray nozzle. Generally, the spray nozzle will generally spray or push a plume of water to be treated towards the upper portion 19 of the internal compartment 20 from the lower portion 18 of the internal compartment 20. Any spray nozzle may be used; however, given the intended solid chemical is a slow dissolving solid chemical, the nozzle should be selected to be one that will have sufficient flow to contact the solid chemical. One particular spray nozzle is an eductor, such as a tank mixing eductor.

Figure 2:
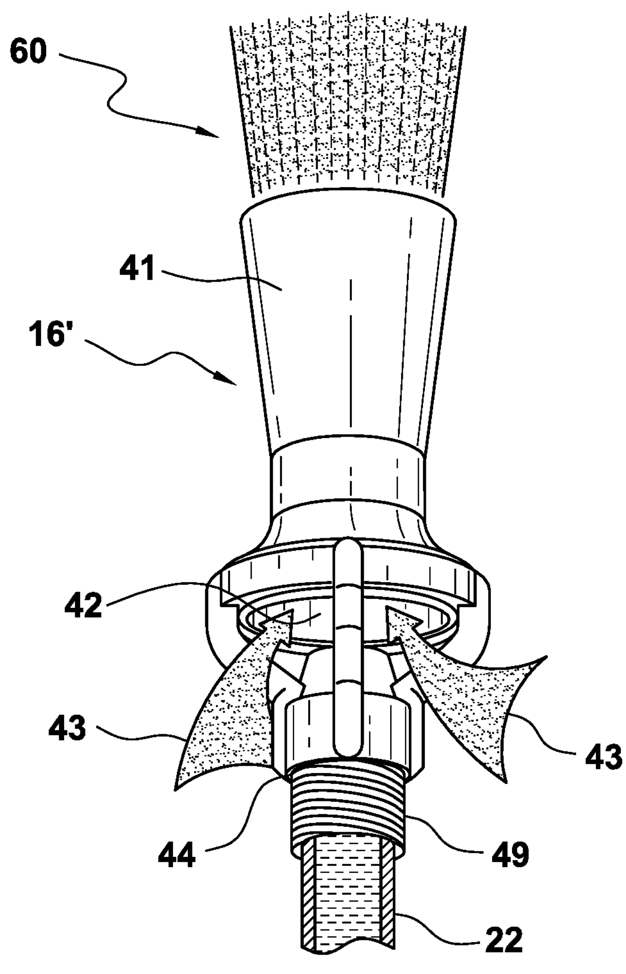
FIG. 2 shows a nozzle useable in the apparatus.

The nozzle 16 is mounted in the interior compartment 20 and discharges water entering thru the inlet 21 toward the solid chemical 70. In this embodiment, the nozzle 16 comprises an eductor 16' (shown in FIG. 2), mounted vertically within the lower portion 18 of the interior compartment 20. In this manner, fluid exiting the eductor 16' is directed upward toward the solid chemical 70. As is shown in FIG. 2, the eductor 16' has an inlet port 44 connecting to water supply line 22 through a coupler 49. Eductor 16' is configured to mix water from the feed line with chemical solution already formed in the feeder, drawing the solution through intake ports 42 that create a venturi effect. FIG. 2 illustrates details of eductor 16'. Suitable eductors include, for example, a "Tank Mixing Eductor" from Spraying Systems Co., Wheaton, Ill. The eductor 16' has an inlet port 44 that connects to water supply line 22, and a discharge port 41. The eductor 16' also has fluid intake ports 42 that create a venturi effect and thereby draw chemical solution back into the eductor 16', as shown schematically by arrows 43. This creates a discharge 60 from the eductor 16'. The discharge is a mixture of the chemical solution in the lower portion 18 of the internal Referring back to FIG. 1, also connected to the inlet 21 on the exterior side is a first water supply pipe 22. The water supply pipe 22 may optionally have a flow meter 14 connected inline of the first water supply pipe 22, but before the inlet 21. The flow meter 14 may optionally have a check valve function as well. An example of a structure includes water flowing into a bottom of the flow meter and exiting the top of the flow meter. The outside of the flow meter has a gauge or scale that allow the interior of the meter to be seen. The interior has a float, generally a ball, that moved towards the exit of the flow meter. When no flow is thru the meter, the float or ball sits in a seat, which prevent water flowing backwards thru the meter, thereby creating a check valve. Optionally, the water supply line 22 may have a water supply valve or shut-off valve (not shown). The water supply valve, allows the water to be stopped from entering the apparatus, for example during maintenance of the apparatus, for example, reloading the solid chemical into the interior compartment 20 of the housing 12. Alternatively, the water supply valve may be used to or used to adjust the flow rate of water into the inlet 21 of the apparatus.

Connected to the outlet 25 is a treated water transporting line 23, which transports the water, treated with the solid treatment chemical (chemical solution), to the place of intended use. The treated water transporting pipe 23 may optionally have an outlet shut off valve located in the line 23. The outlet shut off valve (not shown), allows the water to be stopped from exiting the apparatus 10, for example, during maintenance of the apparatus, e.g., reloading the solid chemical. It also serves the purpose to isolate the apparatus from the body of water being treated with the solid chemical.

Also present in the apparatus is a support 36, located within the interior compartment 20 of the housing 12. The support 36 is adapted to an interior surface of the side 15 of the housing 12 at a position intermediate (i.e., between) the nozzle 16 and the top 13 of the housing 12. There may be one single support 36 or multiple supports at the same distance above the water distribution device (i.e., nozzle 16). The single support 36 may be a continuous support, meaning the support completes a loop on the interior surface. The support 36 serve to support and position the solid chemical above the water distribution device 16, so that the water distribution device may contact the water to be treated with the solid chemical. In a particular embodiment, the support 36 may serve to support and hold a cartridge 72, which is described in more detail below, in place within the interior compartment 20 of the housing. The cartridge 72 will contain the solid chemical 70 and position the solid chemical within the interior compartment 20 of the housing 12.

Figure 3:
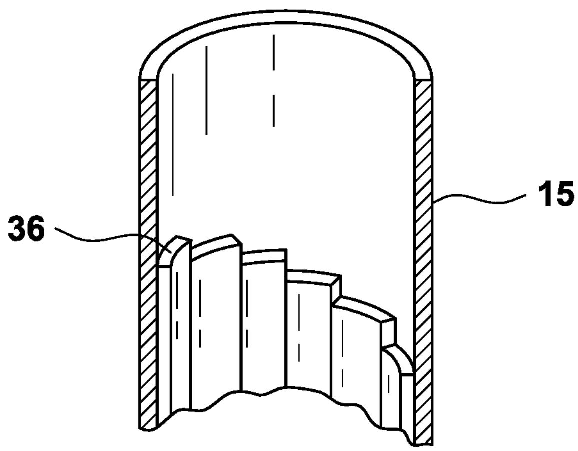
FIG. 3 shows the support with step-like levels.

In one particular embodiment, the support 36 may be a series of supports at different levels. The series of support may be at different levels so that the cartridge 72, which holds the solid chemical 70 can be positioned closer or further away from the nozzle 16. Generally, if there are a series of supports 36 at different levels, there will be a complimentary support, set at the same height or position located directly across the internal compartment 20 on the interior surface of the side 15 or at a geometric position which will support the cartridge. Considering the interior surface of the side 15 being a circle, the complementary support will be in a geometric position if there are two supports 180 degrees apart, 3 supports located 120 degrees apart, 4 supports located at 90 degrees apart, and the like. In one particular embodiment, the series of supports 36 may be set up in a step-like fashion, as is shown in FIG. 3. In each case, there is at least one complementary support located in the interior compartment. In an alternative embodiment, the support 36 may be near the top of the housing 12, and support a cartridge 72 near the top of the cartridge, as will be explained in more detail below.

Figure 4:
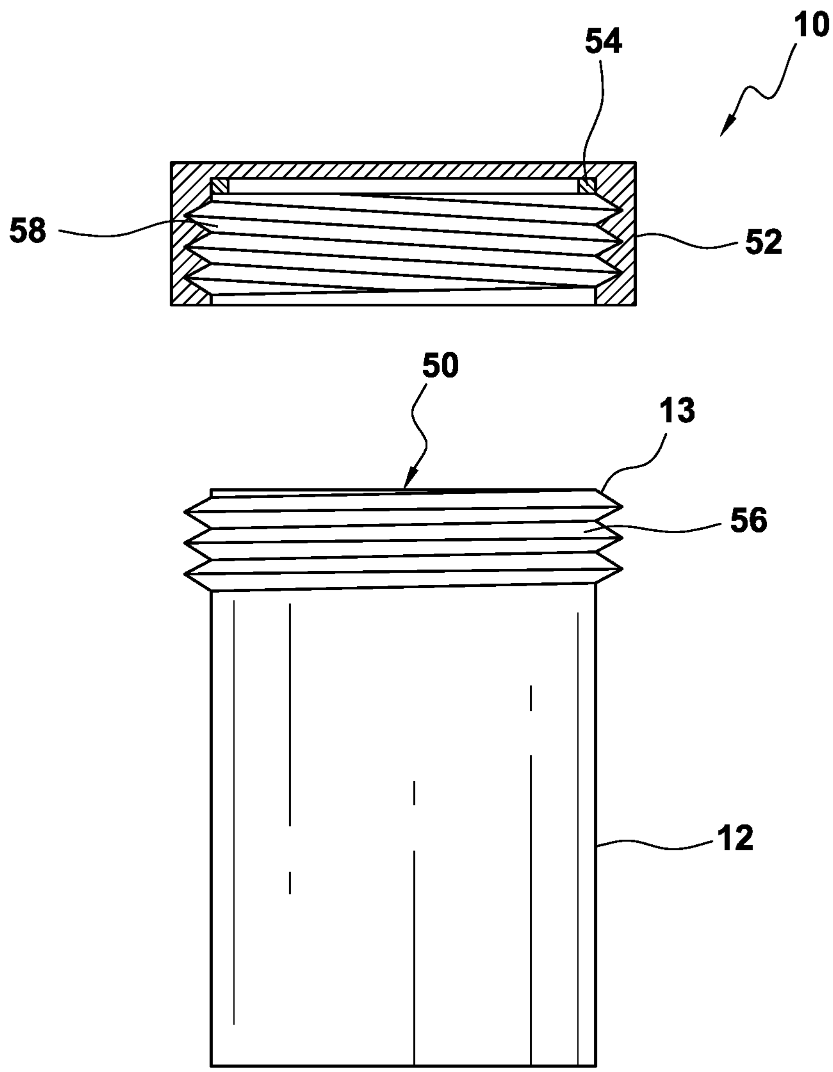
FIG. 4 shows the housing with a removable top.

Referring to FIG. 4, the top 13 of the housing 12 further has an opening 50 and the apparatus 10 further has a cap 52 which is adapted to form a water tight connection with the top 13 of the housing 12. The cap 52 may be removable form the top 13 of the housing 12, which will allow the solid chemical to be inserted into the interior compartment 20 of the housing 12. Any suitable means may be used to create the water tight seal. An exemplary method includes having a seal 54 associated with the cap 52. In addition, as is shown in FIG. 4, the cap 52 may be threaded onto the top 13 of the housing. The top 13 of the housing is provided with threads 56 and the cap 52 has complementary threads 58 located on a portion of the cap 52 that contacts the top 13. The threads 56 may be conventional threads which requires the cap 52 to be turned one or more turns to attach the cap 52 to the top of the housing 12 or may be a bayonet threads, which allow the cap to be placed on on the top 13 of the housing 12 with a partial complete turn of the cap, such as a one-eight, one quarter, one half, or a three quarter turn of the cap 52. Of course, if a bayonet mount is used, the threads 58 on the cap 52 must be made to complement the threads 56 on the top 13 of the housing 12. It is noted that other means to secure the cap 52 to the top 13 may be used without departing from the scope of the present invention. For example, the top 13 may be attached to the housing 12, in a way the top 13 pivots into position and locks into place to create a water tight seal.

Figure 4A:
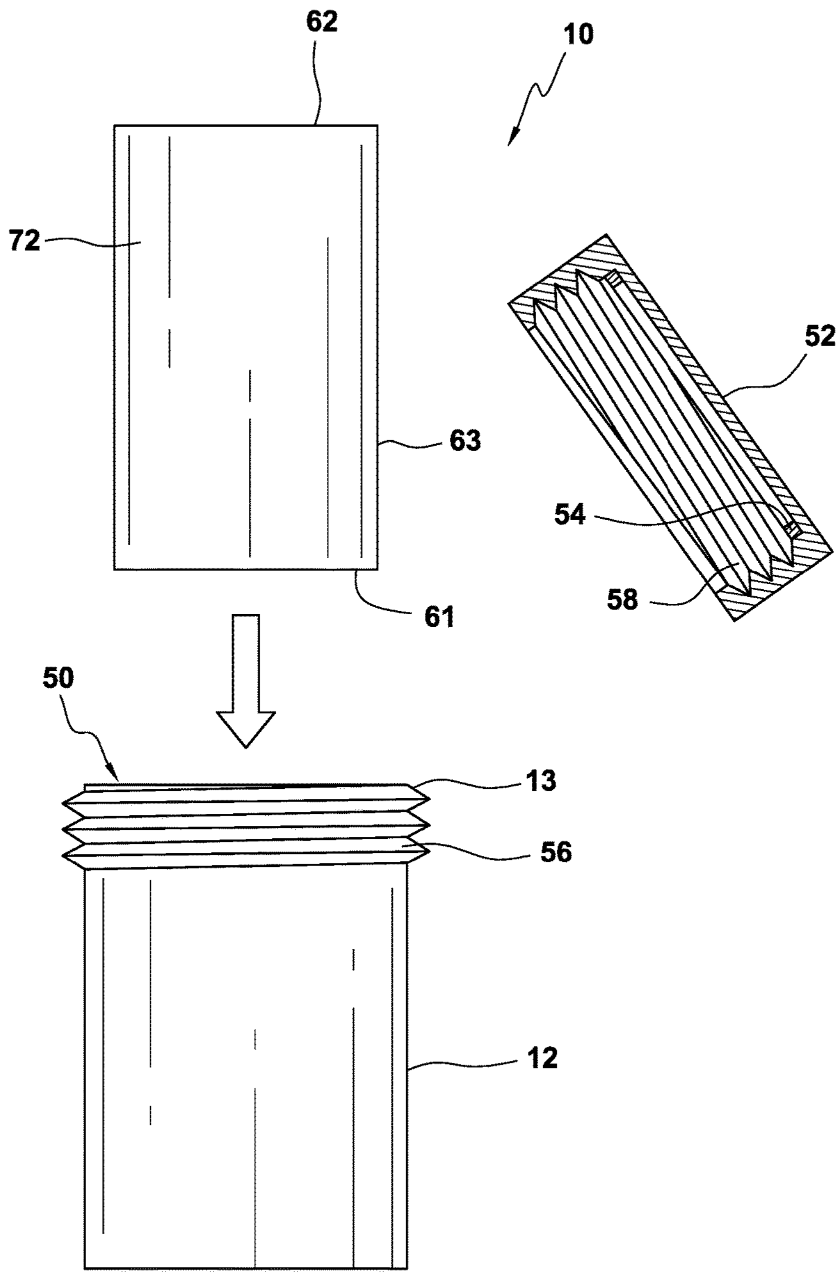
FIG. 4A shows the housing with a removable top and a cartridge which is inserted into the housing.

Referring to FIG. 4A, in the apparatus 10, the solid chemical is generally inserted into the interior compartment (not shown in FIG. 4) of the housing 12 thru the opening 50. The solid chemical may be the solid chemical itself, or the solid chemical may be located in a cartridge 72. The cartridge 72 being adapted to be inserted into the interior compartment of the housing 12 and the interior compartment of the housing 12 is adapted to receive the cartridge 72. The cartridge 72 is generally inserted thru opening 50 in the top 13 of the housing, as is shown in FIG. 4A.

Figure 7:
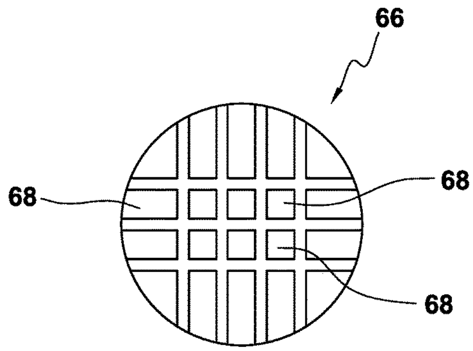
FIG. 7 shows a grid present on one end of the cartridge.
Figure 5:
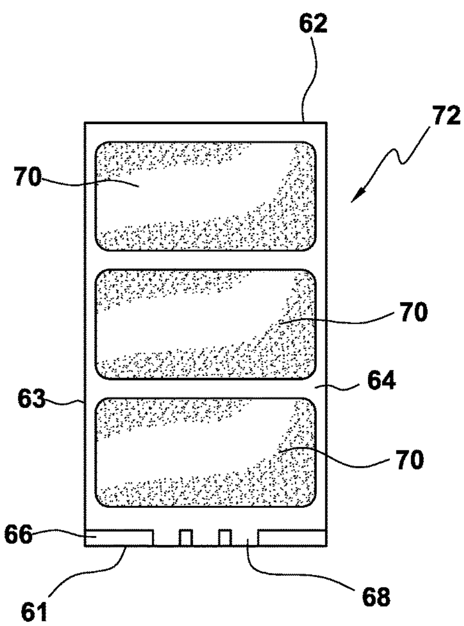
FIG. 5 shows the cartridge with a solid chemical in the cartridge in the form of multiple solids.
Figure 6:
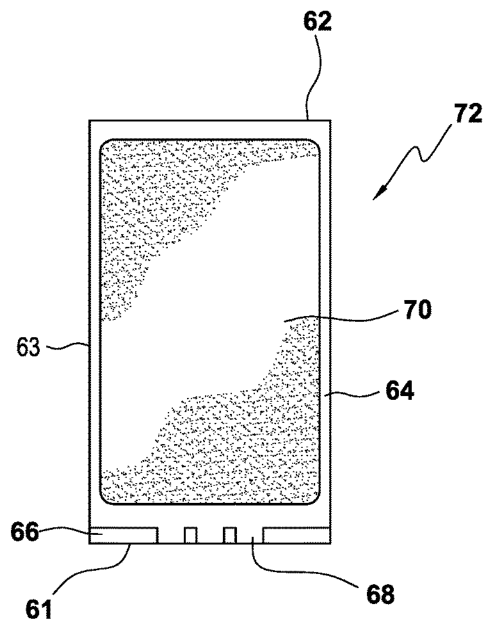
FIG. 6 shows the cartridge with a solid chemical in the cartridge in the form of a unitary structure.

In one embodiment, referring to FIGS. 4A, 5 and 6, the cartridge 72 will have a first end 61 and a second end 62 oppositely positioned from the first end 61. The cartridge 72 will also have a sidewall 63, which connects the first end 61 to the second end 62. The side wall 63, the first end 61 and the second end 62 form an internal chamber 64. The solid chemical 70 will be located or inserted in the internal chamber 64, as shown in FIG. 5 and FIG. 6. Typically, the first end 61 of the cartridge is placed into the housing 12, thru the opening 50 such that the first end 61 of the cartridge 72 is positioned near the nozzle 16. The first end 61 of the cartridge 72 may have a porous grid 66, shown in FIG. 7, having openings 68 in the grid. The openings 68 allow water emitted from the water nozzle 16 to go through the grid 66 and contact the solid chemical 70, in the internal chamber 64 of the cartridge. Typically, as is shown in FIGS. 5 and 6, the cartridge 72 will contain a solid chemical 70 in the internal compartment. As shown in FIG. 5, the solid chemical 70 may be several distinct solid articles. Alternatively, as shown in FIG. 6, the solid chemical 70 may be a unitary structure. The first end 61 of the cartridge may be covered with a cap, a film, a foil and the like, or a combination thereof, to protect the solid chemical during storage and shipping. The second end 62 may be closed or also covered a cap, a film, a foil and the like, or a combination thereof, to protect the solid chemical during storage and shipping. In one embodiment, the first end 61 may be covered with a water soluble film, which dissolves when water to be treated contacts the film from the water distribution device 16.

The grid 66 serves to hold the solid chemical 70 in the cartridge 72 so that the solid chemical does not directly contact the water distribution device 16. If a cartridge 72 holding the solid chemical is not used, a grid or other similar structure will be used to hold the solid chemical spaced apart from the water distribution device 16 in the interior compartment 20 of the housing 12. Generally, the support 36 could be a grid structure, if, a cartridge is not used. Alternatively, support 36 may be a grid structure even if a cartridge is used. In such a case, it would not be necessary to provide the cartridge with a grid.

Figure 8:
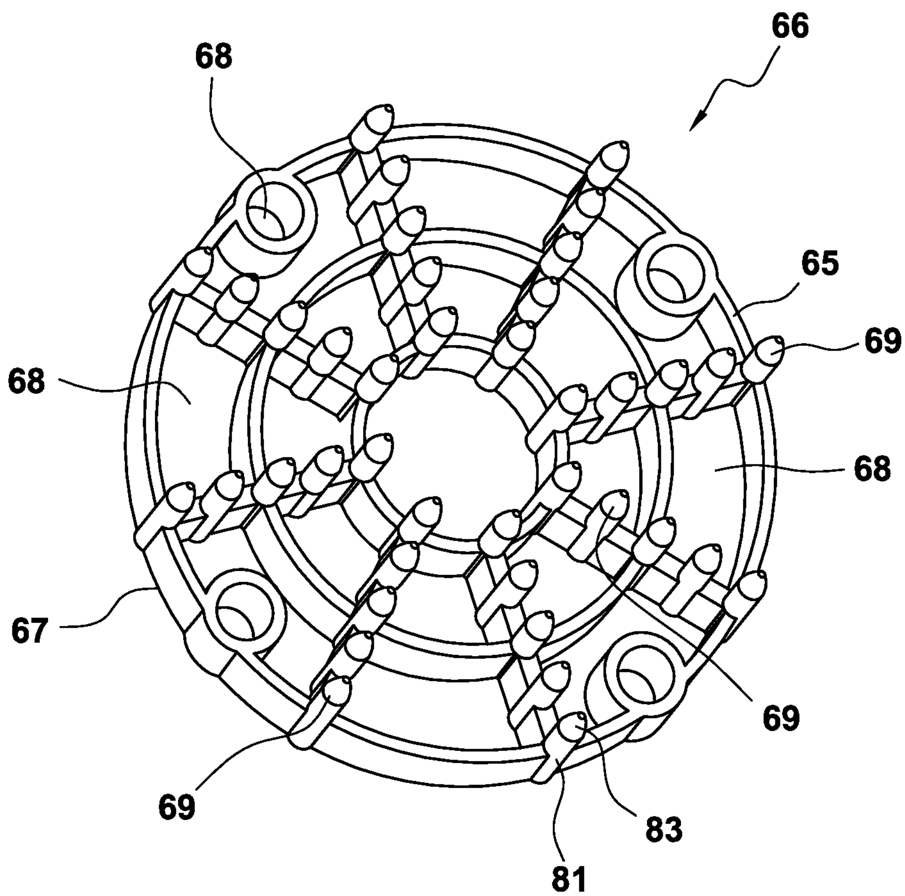
FIG. 8 shows an alternative grid with a plurality of projections

In a particular embodiment, the grid 66 may have a structure such as shown in FIG. 8. In this structure, the porous grid 66 has a first surface 65 and an opposite second surface 67. From the first surface 65, a plurality of projections 69 extend upward and away from the first surface 65 and towards the internal chamber 64 of the cartridge 72 and the second surface of the porous grid 66 faces away from the internal chamber 64 of the cartridge 72. This can also be seen in FIG. 1. Generally, the plurality of projections 69 extend in a generally perpendicular direction from the first surface 65 of the porous grid 66. In a particular embodiment, each of the projections 69 in the plurality of projections 69 has a first end 81 and a second end 83. The first end 81 being located at the first surface 65 of the porous grid 66 and the second end 83 is opposite the first end of the projections 69. As is shown in FIG. 8, the second end 83 of the projections 69 are tapered. The tapered projections 69, as shown in FIG. 8, form pencil-shaped pedestals which contact the tablet with minimal surface area. The small surface area supporting the chemical tablets allow for the flow 60 leaving the eductor 16 to better contact the solid chemical 70 in the apparatus, by minimalizing the surface area of the solid chemical in contact with the support. This will also allow the feed rate of the solid chemical to be increased because the tablet dissolves faster as compared when it is not supported by the projections.

The cartridge 72 is adapted to be placed into the internal compartment 20 of the housing 12 and the housing 12 is adapted to receive the cartridge. By "adapted", it is meant that the cartridge and internal compartment are sized and shaped to have the cartridge 72 to fit in the internal compartment 20 such that the cartridge will fit into and thru the opening 50 and the cap 52 can be positioned on the top 13 of the housing 12 to create a water tight seal. Generally, the shape of the cartridge 72 and the internal compartment 20 will be complementary, meaning they will each have a shape that allow proper placement of the cartridge 72 in the internal compartment 20.

Figure 9:
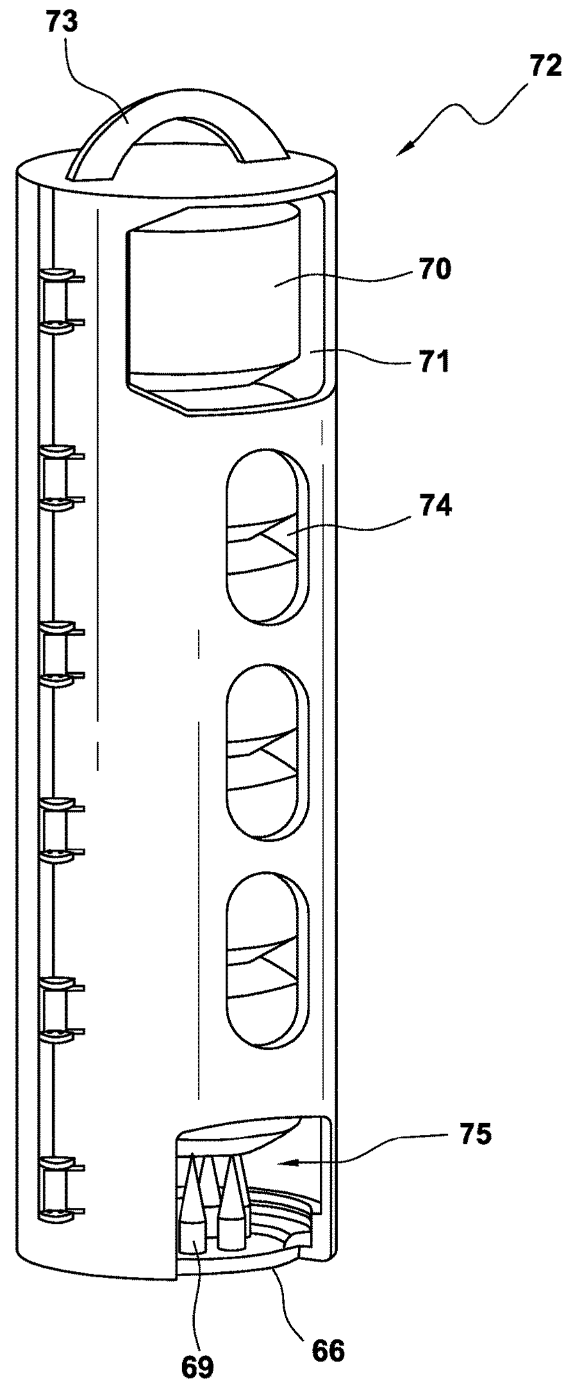
FIG. 9 shows an alternative cartridge with a grid with a plurality of projections.

FIG. 9 illustrates particular embodiment of a cartridge 72 usable in the apparatus 10 according to this embodiment. The porous grid 66, (shown without openings 68), forms the bottom end of the cartridge 72, has projections 69 pointing upward into the interior chamber 64 of the cartridge 72. In this embodiment, porous grid 66 may be removable from the cartridge 72, since the projections 69 are subject to wear, and may be easily replaced by replacing the porous grid.

As shown in FIG. 9, the cartridge 72 has an opening 71 through which the water treatment tablets may be loaded. The size and shape of the opening 71 may be tailored so that the cartridge accepts only a specific type of tablet; this helps to ensure that an appropriate chemical product is used in the apparatus. The cartridge may also include handle 73 at its upper end 62. The sidewall 63 of the cartridge 72 has openings or slots 74, 75 therein. Openings 74 permit alignment of the water treating chemical 70 so that they are stacked uniformly in the cartridge 72. The openings 74 and 75 allow for the water contacting and treated with the water treating chemical 70 to exit the cartridge 72.

Figure 10:
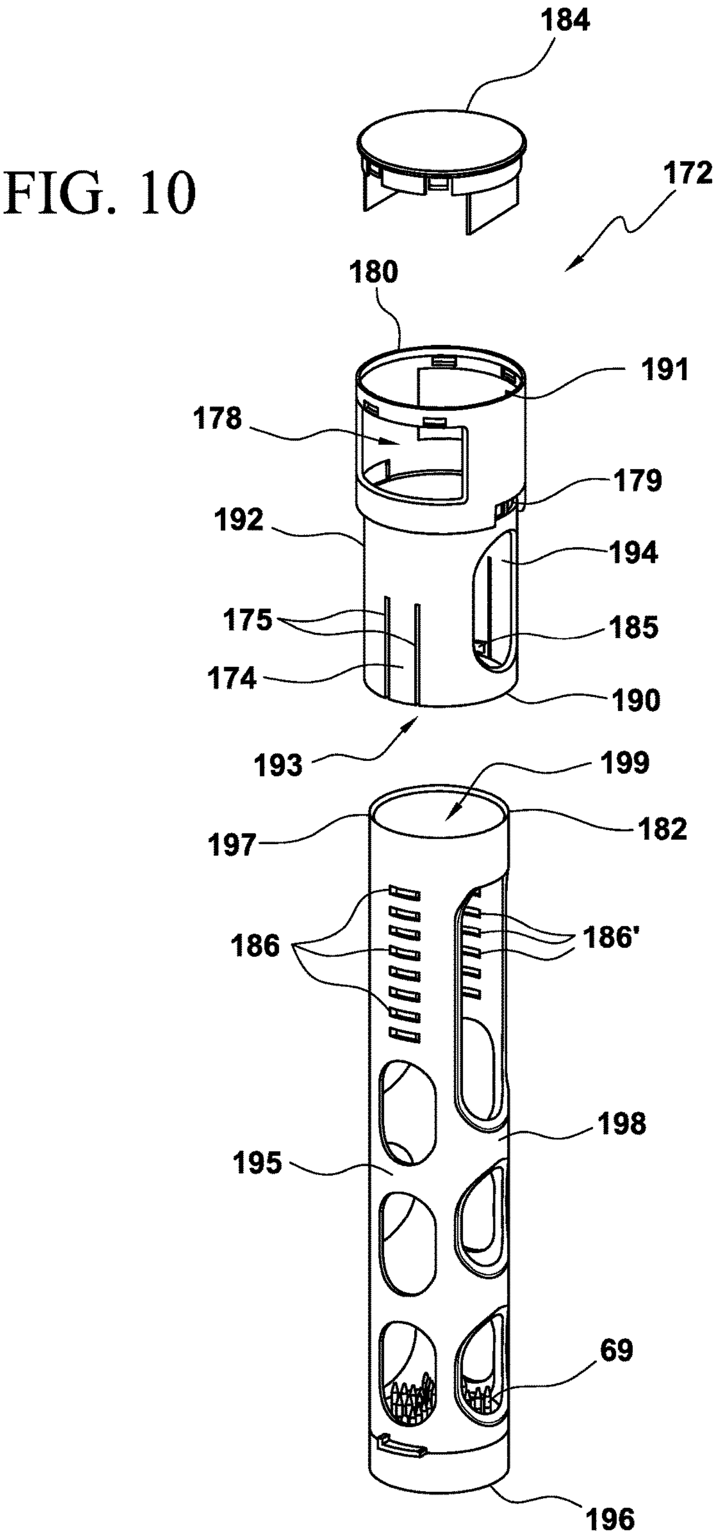
FIG. 10 shows an expanded view of an adjustable cartridge useable in the present invention.
Figure 10A:
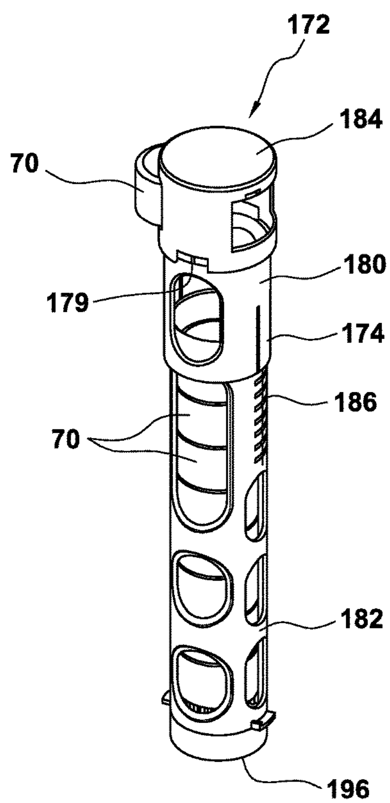
FIG. 10A shows an adjustable cartridge useable in the present invention in an extended configuration.
Figure 10B:
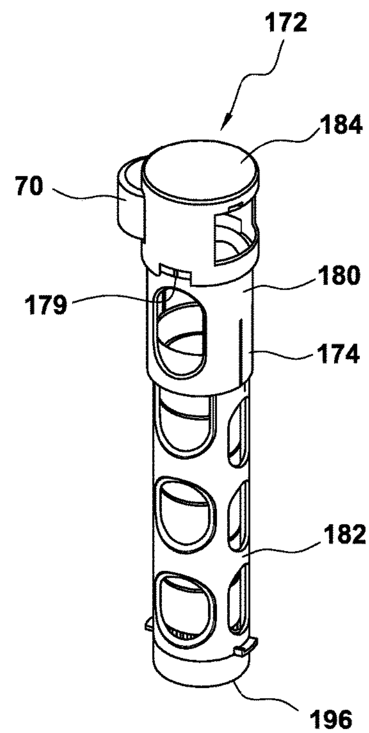
FIG. 10B shows an adjustable cartridge useable in the present invention in a shortened configuration.

In a further embodiment of the present invention, the cartridge may be a cartridge 72 which may have an adjustable length, herein after referred to as "adjustable length cartridge". One example of this cartridge configuration which has an adjustable length is shown in FIGS. 10, 10A and 10B. By having an adjustable length, the distance between the bottom of the cartridge 72 and the nozzle 16 can be adjusted. The further the chemical 70 is away from the cartridge, the slower the chemical 70 will dissolve. This will allow for the rate of dissolution of the chemical to be adjusted into a desired range. Another factor in the dissolution of the chemical is the rate in which the water enters the apparatus. Higher flow rates will increase the dissolution, while lower flow rates will have a slower dissolution rate. By having the adjustable cartridge, the rate of dissolution can be easily adjusted to the desired level in the water.

Referring to FIGS. 10, 10A and 10B, one embodiment of the adjustable length cartridge 172 is shown. The adjustable length cartridge 172 has two parts comprising an upper part 180 and a lower part 182, and an optional cap 184. It is noted that the cap could be integrated into the upper part 180. The upper part 180 and the lower part have a connecting means to connect two parts together. Any suitable means may be used, so long as the upper part 180 and lower part 182 may be adjusted such that the length of the cartridge can be lengthened or shortened to desired length.

In one example, one of the upper part 180 or the lower part 182 has at least one detent 185 (shown on the upper part), and the part without the detent 185 has at least one catch 186. The catch 186 of one part is adapted to receive the detent 185 of the other part, such that the detent 185 and catch 186 join the upper part 180 to the lower part 182 to form the cartridge. Although the detent 185 is shown on the upper part 180, it should be understood that the detent 185 could in fact be located on the lower part 182, without departing from the spirit of the present invention. The detent 185 and catch 186 serve to attach the upper part 180 to the lower part 182.

In a particular embodiment, the upper part 180 has a first end 190, a second end 191 and a side 192 joining the first end 190 of the upper part 180 to the second end 191 of the upper part 180. The first end 190 of the upper part 180 has an opening 193. The side 192 has a detent 185. As shown in FIG. 10, the detent is located on an inner surface 194 of the side 192. The lower part 182 has first end 196, a second end 197 and a side joining 198 the first end 196 of the lower part 182 to the second end 197 of the lower part 182. The second end 197 of the lower part 182 has an opening 199. The side 198 of the lower part 182 has the at least one catch 186. The at least one catch 186 of the lower part 182 is adapted to receive the detent 185 of the upper part 180, such that the upper part 180 and the lower part 182 are connected together via the detent 185 and catch 186 system.

The lower part 182 is sized and shaped to fit into the opening 193 of the upper part 180. The size and shape of both parts must be complementary to one another so that the detents 185 will engage the catches 186. This will serve to connect the the upper part 180 to the lower part 182, thereby forming the cartridge 182. Generally, size and shape of the lower part 182 will be circular, as shown in FIG. 10, as is the upper part 180. When circular, opening 199 will have a smaller diameter than the opening 193 of the upper part 180. This will allow a portion of the side 198 of the lower part 182 to fit into or slide into the opening 193 of the upper part 180. As can be seen in FIG. 10, an exterior surface 195 of the side 198 of the lower part 182 contacts an interior surface 194 of the side 192 of the upper part 180. Typically there are at least two detents 185 on the interior surface 194 of the side 192 of the upper part 182 and there are plurality of catches 186 located in the exterior surface 195 of the lower part 182.

Typically, there are two or more detents 185 on the upper part 180. There are more than one catch 186 located on the part with the catch 186 as is shown in FIG. 10. Generally there are 2-12 catches 186 located on the part with the catch 186. The number of catches 186 can be adjusted to give the number of desired adjustments needed for the adjustable cartridge. The catches are shown to be in a vertical arrangement, however, it is noted that the catches could be offset from a vertical arrangement, without departing from the scope of the invention. As shown in FIG. 10, there are 8 catches, but between 6 and 10 catches will typically be used. In addition, there will generally be two sets of catches 186' on opposite sides of side 198 of the lower portion. The catches 186 and 186' are positioned such that the detents 185 of the upper portion will engage the catches 186, 186' when the lower part 182 is positioned within the upper part 180.

The detent 185, shown on the interior surface 194 of the upper part 180 are generally protrusions from the interior surface 194. The catches 186 on the lower part 182 are generally recesses or openings in the side 198 of the lower part 182 that are sized and shaped to accept and engage the detent 185 of the upper part. In addition, the side 192 of the upper part has a portion 174 which is movable and will have a spring-like action, allowing the detent 185 to remain engaged with the catch 186 on the lower part. This spring-like action may be provided by cutting two slits 175 in side 192 which extend from the opening 193 upwards towards to the second surface. This will allow the portion 174 of the side 192 to move outwardly when the detent 185 engages the side 198 of the lower part 182 without the catches 186. As shown in FIG. 10, there are two portions 174 which will have the spring-like action. There could be three, four or more portions 174. Alternatively, there could be a single portion 174 with spring-like action on the side 192.

The plurality of catches 186 are positioned along the exterior side 195 of the lower part 182 and are positioned near the second end 197 such that the catches 186 allow an overall length of the cartridge to be adjusted. Referring to FIG. 10A, the top catch 186, or the catch closest to the opening 199 of the lower part 182 is engaged by the detent 185 creating a longer cartridge. This allows the first end 196 of the lower part 182 to be positioned closer to the nozzle when the cartridge 172 is positioned within the interior compartment 20 of the apparatus 10. Referring to FIG. 10B, the top catch 186, or the catch furthest from the opening 199 of the lower part 182 is engaged by the detent 185 creating a shorter cartridge. In this configuration, the first end 196 of the lower part 182 to be positioned further away from the nozzle when the cartridge 172 is positioned within the interior compartment 20 of the apparatus 10.

As can be seen in FIG. 10, the upper part 180 also has an opening 178 which will allow the solid chemical 70, shown as a tablet, to be loaded into the adjustable length cartridge 172. Loading of the adjustable length cartridge is shown in FIGS. 10A and 10B. The cap 184 may be rotatable to allow the solid chemical to be inserted into the cartridge and rotated to close the opening to prevent the solid chemical from accidently being removed from the cartridge when the cartridge is being loaded into the housing.

Figure 11:
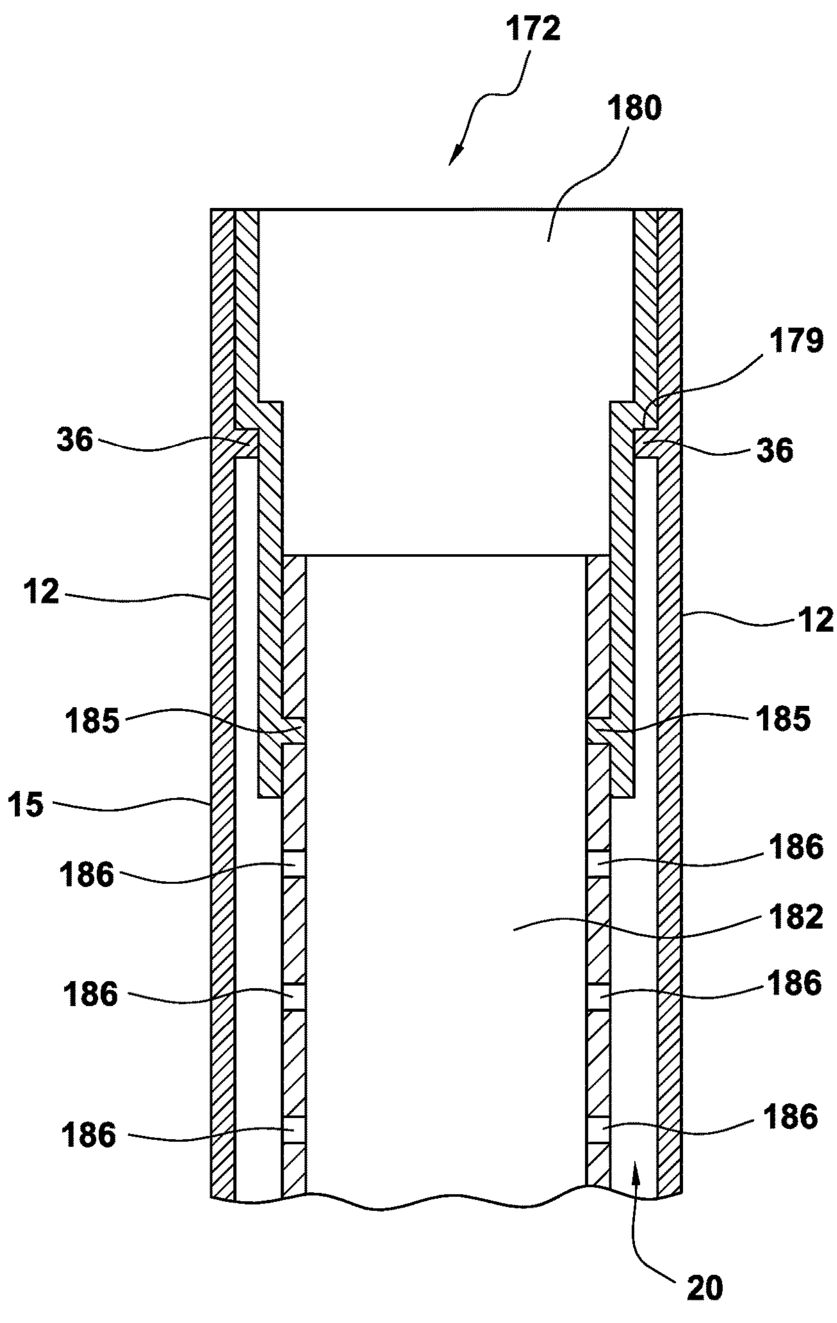
FIG. 11 shows a cross-section of an adjustable cartridge place in the housing of the apparatus.

When the adjustable length cartridge 172 is used, the support 36, shown in FIG. 1, will be positioned higher in the interior compartment 20 of the apparatus 10 in the upper portion 19 of the housing 12. To show this configuration, FIG. 11 shows a partial cross-sectional view of the upper portion 19 of the housing 12, having the supports 36 extending from on interior surface of the side 15. The adjustable length cartridge 172 is shown positioned in the interior compartment 20 of the housing 12. The support engaging member 179, which is located somewhere on the cartridge. As shown in FIGS. 10, 10A, 10B, and 11 the support engaging member 179 is located on the upper part 180 of the adjustable length cartridge 172. This will allow the adjustable length cartridge 172 to be positioned in the apparatus such that the lengthened cartridge of FIG. 10A will have the lower FIG. 11 also shows the detent feature 185 engaging the catch 186. As shown, the detent 185 is a projection from the inner surface of the upper part 180 of the adjustable length cartridge 172. The catches 186 are shown as a hole in the lower part 182, which are sized and shaped to accept the detent 185 feature such the a force will need to be applied to the detent 185 feature to disengage the detent 185 feature from the catch 186. One such force include a rotational force with will cause the detent to contact the edges of the catch and force the detent 185 from our of the catch by causing the portion 174 of the side to move outwards, releasing the detent 185 from the catch. Alternatively, the portion 174, could be manipulated by a user by applying a force to the portion 174 to release the detent 185 from the catch.

Figure 12:
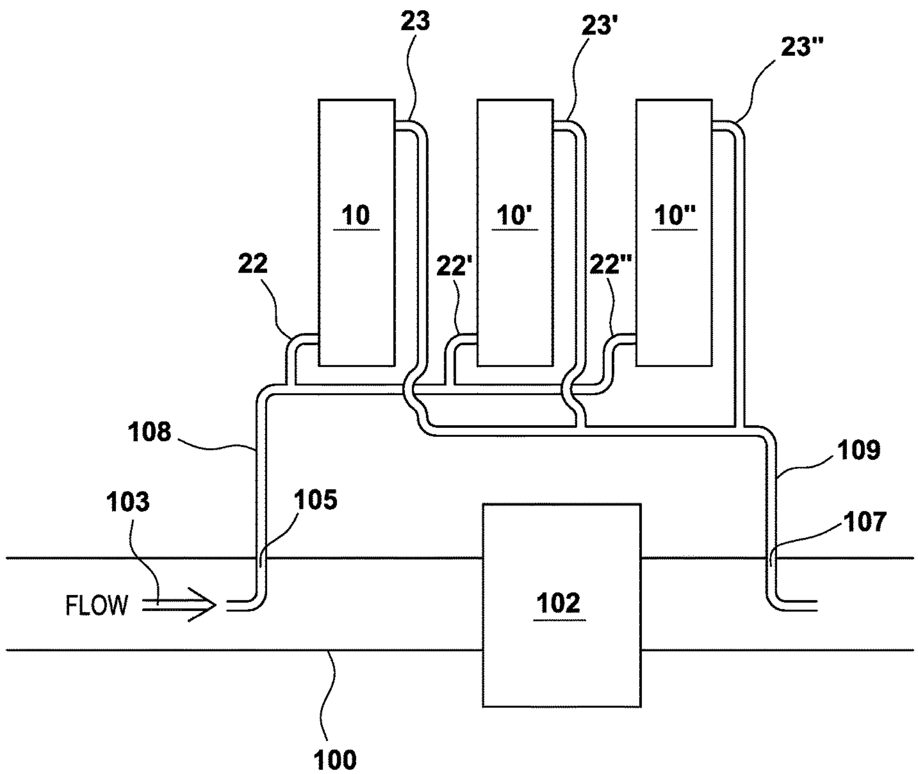
FIG. 12 shows a main line tap to achieve flow to the apparatus and a return to the main line.

The apparatus 10 of the present disclosure is designed to be used as an off-line feeder, or a feeder that is placed on a by-pass loop off the main circulation line. To gain a better understanding of this, attention is directed to FIG. 12. As shown in FIG. 12, the main circulation line 100 has a direction of flow 103. In-line of the main circulation line is a device 102, which will create a pressure drop. The in-line device could be a filter, a valve, a heater or any other device that will create a pressure drop. The bypass line 108 is connected to the main line 100 using any known method. For example, a T-joint could be place in the main line or other methods such as saddle clamps could be used as well. An example of a suitable saddle clamps suitable for use in the present invention are described in U.S. Pat. No. 7,329,343 to Barnes, which is hereby incorporated by reference. The water for the bypass lines is drawn into the bypass line thru outlet 105 created in the main line 100. The water entering the bypass line enters the inlet line 22, which in turn the water enters the apparatus 10, as described above. Treated water is returned to the main line thru the return line 109, which is connected to treated water transporting line 23. The return line 109 is connected to the main line 100 thru inlet 107 in a similar fashion as it is removed from the main line 100. It is noted that the inlet 107 and outlet 105 do not need to be the same type of connection.

Flow in the bypass loop, lines 108 and 109 and thru the apparatus is created by the pressure drop in the main line 100. The flow in the bypass loop can be adjusted by the pressure drop in the main line or the size of the piping in the bypass loop. During operation, the apparatus 10 fills up with water. The flow rate into the apparatus is dependent on the size of the piping. But having the water entering the apparatus 10 thru an eductor 16', the flow rate within the apparatus in increased up to 2-4 times the flow rate entering or exiting the apparatus. This allows the water to be contacted onto the solid chemical at a rate higher than the flow rate into the apparatus 10. This is because the eductor 16' also has fluid intake ports 42 that create a venturi effect and thereby draw chemical solution back (the solution remaining in the interior compartment 20) into the eductor 16', as shown schematically by arrows 43 as describe above for FIG. 2. This increase in the flow rate within the interior compartment 20 allows the solid chemical to dissolve in an efficient manner, even if the flow rate entering and exit the apparatus is insufficient to dissolve the solid chemical.

Also provided by the present invention is a water treatment system which will have multiple apparatus described above. The second or subsequent apparatus may be positioned in series or in parallel with the first apparatus. Also as shown in FIG. 10, there can be multiple apparatus 10, 10' and 10" connected together. As is shown in FIG. 10, the apparatus 10, 10' and 10" are connected in parallel with one another. In such a case, the inlet 22 and the additional inlets 22' and 22" are connected to a single water supply pipe or bypass line 108 which is drawn from the main line 100. Likewise, the outlet 23 and the additional outlets 23' and 23' are connected to the same return line 109 to return the treated water to the main supply line 100. It is desirable to use multiple apparatuses 10, 10' and 10" if a larger quantity of water needs to be treated. When multiple apparatuses are used, the water supply pipe 108 and the return line 109 will need to be of a larger diameter to handle the increase in water needed to operate the apparatuses. As is shown in FIG. 12, there are 3 separate apparatuses. However, the number of apparatuses used, when multiple apparatuses are used, is generally in the 2-10 range.

The solid chemical usable in the apparatus of the present invention will typically be a solid water treating chemical, such as a disinfectant, an algaecide or other water treating chemical commonly used in pools and spas. The solid chemical may be a bromine releasing chemical, a chlorine releasing chemical, a peroxide releasing chemical, a biguanide releasing chemical and the like. The solid chemical may be a sanitizer, an algaecide, a clarifier, a pH adjustment, a water balancer. One particular water treatment chemical is calcium hypochlorite, in a slow dissolving form, such as one having a high lime content. This is slow dissolving calcium hypochlorite is described in US Patent Application Publication 2016/0330972 A1, which is hereby incorporated by reference.

The apparatus 10 of the present invention may be used to treat water which is present in a recirculating body of water, such as a swimming pool or spa, on an industrial body of water. Generally, the water being from the recirculated body of water is drawn through a pump in a recirculating line and the pipes 24 and 26 are connected on to the recirculating line.

In addition, the apparatus of the present invention may be used in conjunction with other water treatment devices, such as liquid chemical dispensing device, a chlorine generating device, an active hydroxyl generating device, an ozone generating device, an ultraviolet light device and the like. The additional devices may be separate units or built into a single unit. These additional devices may be in parallel or in series with the apparatus of the present invention.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. An apparatus for forming a water solution of a chemical from a solid chemical, the apparatus comprising:

(i) a housing, having a top, a side, and a bottom, where the top and the bottom are connected to one another by the side, said top, said side and said bottom form an interior compartment, and the housing having an upper portion and a lower portion;

(ii) an inlet located in the lower portion of the housing, the inlet allowing water to be contacted with the solid chemical to enter the housing;

(iii) an outlet located in the upper portion of the housing, the outlet allowing the water contacted with the solid chemical to exit the housing;

(iv) a nozzle disposed within the interior compartment, said nozzle is connected to the water inlet and said nozzle being located within the interior compartment of the housing in the lower portion of the housing, wherein the nozzle allows water entering the housing thru the inlet to contact the solid chemical; and (v) at least one support located within the interior compartment positioned between the nozzle and top of the housing, said support is adapted to receive and position a cartridge containing the solid chemical within the interior compartment of the housing or to support a solid chemical in the housing;

wherein the top of the housing comprises an opening which allows a cartridge containing a solid chemical or a solid chemical to be inserted into the housing, and the apparatus further comprises a cap, said cap is adapted cover the opening of the housing and to form a water tight connection with the top of the housing;

wherein apparatus further comprises a cartridge, said cartridge having a first end, a second end, and a sidewall connecting the first end to the second end, the first end, second end and sidewall form an internal chamber, said internal chamber containing a solid chemical, and the cartridge being adapted to fit into the interior compartment of the housing between the top of the housing and the nozzle, wherein the cartridge contacts the at least one support located in the interior compartment of the housing the at least one support positions the cartridge containing the solid chemical within the interior compartment of the housing, and such that the cartridge may be inserted into the interior compartment thru said opening in the housing; and wherein the first end of the cartridge comprises a porous grid, and when the cartridge is positioned in the interior compartment of the housing, the cartridge being inserted in the housing such that the first end is positioned near the nozzle and the second end is positioned near the top of the housing.

2. The apparatus according to claim 1, wherein the cap is removable from the housing to reveal the opening and to allow the solid chemical or cartridge containing the solid chemical to inserted into the interior compartment of the housing.

3. The apparatus according to claim 1, wherein the nozzle comprises an eductor.

4. The apparatus according to claim 3, wherein the eductor is positioned in the housing such that there is a flow of the water within the housing towards the top of the housing from the eductor.

5. The apparatus according to claim 4, wherein the eductor comprises at least one fluid intake port which creates a venturi effect and allows water in the lower portion of the housing to be drawn into the eductor with the water entering the eductor thru the inlet and to be sprayed towards the top of the housing.

6. The apparatus according to claim 1, wherein the porous grid has a first surface and an opposite second surface, the first surface comprising a plurality of projections, extending outward and away from the first surface and towards the inner chamber of the cartridge and the second surface of the porous grid faces away from the internal chamber of the cartridge.

7. The apparatus according to claim 6, wherein the plurality of projections extend in a generally perpendicular direction from the first surface.

8. The apparatus according to claim 7, wherein the plurality of projections have a first end and a second end, the first end of the projections being located at the first surface of the porous grid and the second end of the projections is opposite the first end of the projections, the second end of the projections comprising a tapered end.

9. The apparatus according to claim 1, wherein the at least one support comprises a series of supports, which allow a cartridge placed in the internal compartment of the housing to be positioned at different levels.

10. An apparatus for forming a water solution of a chemical from a solid chemical, the apparatus comprising:

(i) a housing, having a top, a side, and a bottom, where the top and the bottom are connected to one another by the side, said top, said side and said bottom form an interior compartment, and the housing having an upper portion and a lower portion;

(ii) an inlet located in the lower portion of the housing, the inlet allowing water to be contacted with the solid chemical to enter the housing;

(iii) an outlet located in the upper portion of the housing, the outlet allowing the water contacted with the solid chemical to exit the housing;

(iv) a nozzle disposed within the interior compartment, said nozzle is connected to the water inlet and said nozzle being located within the interior compartment of the housing in the lower portion of the housing, wherein the nozzle allows water entering the housing thru the inlet to contact the solid chemical; and (v) at least one support located within the interior compartment positioned between the nozzle and top of the housing, said support is adapted to receive and position a cartridge containing the solid chemical within the interior compartment of the housing or to support a solid chemical in the housing;

wherein the at least one support comprises a series of supports, which allow a cartridge placed in the internal compartment of the housing to be positioned at different levels; and wherein the series of supports comprises a series of steps located on each side of the internal compartment, where each support has a complementary support within the internal compartment on the opposite side of the internal compartment.

11. An apparatus for forming a water solution of a chemical from a solid chemical, the apparatus comprising:

(i) a housing, having a top, a side, and a bottom, where the top and the bottom are connected to one another by the side, said top, said side and said bottom form an interior compartment, and the housing having an upper portion and a lower portion;

(ii) an inlet located in the lower portion of the housing, the inlet allowing water to be contacted with the solid chemical to enter the housing;

(iii) an outlet located in the upper portion of the housing, the outlet allowing the water contacted with the solid chemical to exit the housing;

(iv) a nozzle disposed within the interior compartment, said nozzle is connected to the water inlet and said nozzle being located within the interior compartment of the housing in the lower portion of the housing, wherein the nozzle allows water entering the housing thru the inlet to contact the solid chemical; and (v) at least one support located within the interior compartment positioned between the nozzle and top of the housing, said support is adapted to receive and position a cartridge containing the solid chemical within the interior compartment of the housing or to support a solid chemical in the housing;

wherein the top of the housing comprises an opening which allows a cartridge containing a solid chemical or a solid chemical to be inserted into the housing, and the apparatus further comprises a cap, said cap is adapted cover the opening of the housing and to form a water tight connection with the top of the housing;

wherein apparatus further comprises a cartridge, said cartridge having a first end, a second end, and a sidewall connecting the first end to the second end, the first end, second end and sidewall form an internal chamber, said internal chamber containing a solid chemical, and the cartridge being adapted to fit into the interior compartment of the housing between the top of the housing and the nozzle, wherein the cartridge contacts the at least one support located in the interior compartment of the housing the at least one support positions the cartridge containing the solid chemical within the interior compartment of the housing, and such that the cartridge may be inserted into the interior compartment thru said opening in the housing; and wherein the at least one support comprises a series of supports, which allow a cartridge placed in the internal compartment of the housing to be positioned at different levels wherein the cartridge has two parts comprising an upper part and a lower part, wherein the upper part and the lower part are adjustably connected together with a connection means.

12. The apparatus according to claim 11, wherein connection means comprises a detent and a catch, wherein one of the upper part or the lower part has at least one detent, and the part without the detent has at least one catch, and wherein the catch of one part is adapted to receive the detent of the other part wherein the detent and catch join the upper part to the lower part to form the cartridge.

13. The apparatus according to claim 12, wherein the upper part has a first end, a second end and a side joining the first end of the upper part to the second end of the upper part, the first end of the upper part of having an opening, and the side of the upper part has the detent, and the lower part has first end, a second end and a side joining the first end of the lower part to the second end of the lower part, the second end of the lower part having an opening, wherein the side of the lower part has the at least one catch, wherein the catch is adapted to receive the detent of the upper portion such that the first upper part and the second lower part are connected via the detent and catch.

14. The apparatus according to claim 13, wherein the second end of the lower part is sized and shaped to fit into the opening of the first end of the upper part such that an exterior surface of the side of the lower part contacts an interior surface of the side of the upper part, and there are at least two detents on the interior surface of the side of the upper part and there are plurality of catches located in the exterior surface of the lower part.

15. The apparatus according to claim 14, wherein the plurality of catches are positioned along the exterior side of the lower part positioned near the second end of the lower part such that the catches allow an overall length of the cartridge to be adjusted, allowing the first end of the lower part to be positioned closer or further away from the nozzle when the cartridge is positioned within the interior compartment of the apparatus.

16. The apparatus according to claim 1, further comprising at least one additional module for forming a water solution from a solid chemical, each additional module comprising:

a) an additional housing, having a top, a side, and a bottom, where the top and the bottom are connected to one another by the side, said top, said side and said bottom form an additional interior compartment, and the additional housing having an upper portion and a lower portion;

b) an additional inlet located in the lower portion of the additional housing, the additional inlet allowing water to be contacted with the solid chemical to enter the additional housing;

c) an additional outlet located in the upper portion of the additional housing, the additional outlet allowing the water contacted with the solid chemical to exit the additional housing;

d) an additional nozzle disposed within the additional interior compartment, said additional nozzle is connected to the water additional inlet and said additional nozzle being located within the additional interior compartment of the additional housing in the lower portion of the additional housing, wherein the additional nozzle allows water entering the additional housing thru the additional inlet to contact the solid chemical in the additional internal compartment; and e) at least one support located within the additional interior compartment positioned between the additional nozzle and top of the additional housing, said support is adapted to receive and position a cartridge containing the solid chemical within the additional interior compartment of the additional housing or to support a solid chemical within the housing.

17. The apparatus according to claim 16, wherein at least one additional water treatment module is in series with a first water treatment module, such that the inlet and the additional inlets are connected to a single water supply pipe and the outlet and the additional outlets are connected to the same return pipe.

18. The apparatus according to claim 1, further comprising a water supply line and a water return line, the water supply line and the water return line form a bypass line of a main line of flow, the water supply line is positioned to remove water at a place of having a first pressure and the water return line is position to return treated water at a place in the main line of flow having a second pressure which is lower than the first pressure.

19. An apparatus for forming a water solution of a chemical from a solid chemical, the apparatus comprising:

(i) a housing, having a top, a side, and a bottom, where the top and the bottom are connected to one another by the side, said top, said side and said bottom form an interior compartment, and the housing having an upper portion and a lower portion;

(ii) an inlet located in the lower portion of the housing, the inlet allowing water to be contacted with the solid chemical to enter the housing;

(iii) an outlet located in the upper portion of the housing, the outlet allowing the water contacted with the solid chemical to exit the housing;

(iv) a nozzle disposed within the interior compartment, said nozzle is connected to the water inlet and said nozzle being located within the interior compartment of the housing in the lower portion of the housing, wherein the nozzle allows water entering the housing thru the inlet to contact the solid chemical; and (v) at least one support located within the interior compartment positioned between the nozzle and top of the housing, said support is adapted to receive and position a cartridge containing the solid chemical within the interior compartment of the housing or to support a solid chemical in the housing;

wherein the support comprises a porous grid, the porous grid having a first surface and an opposite second surface, the first surface comprising a plurality of projections, extending upward and away from the first surface.

20. A cartridge for holding a solid chemical, said cartridge comprising a first end, a second end, and a sidewall connecting the first end to the second end, the first end, second end and sidewall form an internal chamber, said internal chamber containing a solid chemical, and the cartridge being adapted to fit into an interior compartment of water treatment apparatus, wherein the first end of the cartridge comprises a porous grid to allow water to contact a solid chemical within the internal chamber and the porous grid has a first surface and an opposite second surface, the first surface comprising a plurality of projections, extending outward and away from the first surface and towards the inner chamber of the cartridge and the second surface of the porous grid faces away from the internal chamber of the cartridge.

21. The cartridge according to claim 20, wherein the plurality of projections have a first end and a second end, the first end being located at the first surface of the porous grid and the second end is opposite the first end of the projections, the second end comprising a tapered end.

22. The cartridge according to claim 20, wherein the cartridge comprises an upper part and a lower part, wherein the upper part and the lower part are adjustably connected together with a connection means.

23. The cartridge according to claim 22, wherein the upper part has a first end, a second end and a side joining the first end of the upper part to the second end of the upper part, the first end of the upper part of having an opening, and the side of the upper part has the detent, and the lower part has first end, a second end and a side joining the first end of the lower part to the second end of the lower part, the second end of the lower part having an opening, wherein the side of the lower part has the at least one catch, wherein the catch is adapted to receive the detent of the upper portion such that the first upper part and the second lower part are connected via the detent and catch.

24. A method of creating a chemical solution from a solid chemical using water, comprising placing the apparatus according to claim 1 on a bypass line from a main water flow line, and flowing water from the main water flow thru the bypass line, and returning the chemical solution to the main water flow line.

* * * * *